United States Patent [19]
Montague et al.

[11] Patent Number: 5,978,209
[45] Date of Patent: Nov. 2, 1999

[54] LOCK-DOWN DEVICE FOR A CIRCUIT BREAKER ASSEMBLY AND ASSEMBLY INCORPORATING SAME

[75] Inventors: Wade A. Montague, Southington; David Arnold Reid, Forestville; Jon Peter McCuin, Bristol; Marshall Baldwin Hart, Middletown, all of Conn.

[73] Assignee: General Electric Company, Schenectady, N.Y.

[21] Appl. No.: 09/134,138

[22] Filed: Aug. 14, 1998

[51] Int. Cl.$^6$ .................................................. H02B 1/04
[52] U.S. Cl. ...................... 361/634; 361/652; 361/654; 361/673; 200/50.01; 200/50.11; 200/294; 29/453
[58] Field of Search ................................. 361/115, 634, 361/635, 652, 653, 654, 655, 673, 828; 200/50.1, 50.11, 294, 318, 296; 248/507; 29/453, 525.12, 854; 174/138 F

[56] References Cited

U.S. PATENT DOCUMENTS 3,174,078   3/1965   Koenig ..................................... 361/654

*Primary Examiner*—Leo P. Picard
*Assistant Examiner*—Michael Datskovsky
*Attorney, Agent, or Firm*—Arthur G. Schaier; Carl B. Horton

[57] ABSTRACT

A lock-down device for use in a circuit breaker assembly. The device comprises a base for releasably securing the device to the assembly's saddle, an arm portion connected to the base, and a hand portion, connected to the arm portion, for engaging the housing of a first circuit breaker such that when the first circuit breaker and a second circuit breaker is mounted on the saddle the hand portion is intermediate the first and second circuit breakers and the first circuit breaker cannot be inadvertently removed from the saddle. In an alternative embodiment, the hand portion of the device comprises flanges for engaging and permitting the lock-down of the second circuit breaker as well.

13 Claims, 8 Drawing Sheets

LOCK-DOWN DEVICE FOR A CIRCUIT BREAKER ASSEMBLY AND ASSEMBLY INCORPORATING SAME

BACKGROUND OF THE INVENTION

The present invention is generally directed to circuit breaker assemblies and devices to secure the circuit breakers to a circuit breaker saddle, and in particular, to an improved lock-down device that prevents the inadvertent removal of circuit breakers from the saddle upon which the breakers are mounted, while achieving maximum utilization of the saddle on which the circuit breakers are mounted. The invention is also directed to a circuit breaker assembly that utilizes such a lock-down device.

Over the years, attempts have been made to adequately ensure the safety of humans while handling circuit breakers. One such concern is faced when a user confronts a main circuit breaker which is electrically connected to a utility line. As it would be appreciated, removal of the main breaker while current is flowing into the breaker could spell disaster for anyone coming into contact therewith. Accordingly, by code, it is required that this main circuit breaker be "locked-down" so that any inadvertent removal is eliminated. At least two approaches are known which have attempted to achieve the goal of eliminating inadvertent removals. As will be explained in further detail below, one known prior lock-down arrangement secures the circuit breakers from the rear. Undesirably, this requires that each circuit breaker have its own lock-down device. Another known approach of locking-down a main circuit breaker utilizes a lock-down device that extends across the saddle. As explained in further detail below, this approach is undesirable since it effectively eliminates the ability to mount a maximum number of circuit breakers on the saddle.

Specifically, in the situation whereby it is necessary to mount, in facing alignment, two back fed main breakers (one line from a standard utility and one line from a generator) or one main breaker and at least one branch breaker, the aforementioned lock-down methodologies are less than desirable. That is, in the first example, two lock down devices would be required to achieve the locking down of both back fed main breakers. In the latter example, if the lock-down device extends across the saddle, the slot for the branch breaker may be unusable.

The current circuit breaker art is therefore deficient for its inability to provide an assembly that can maximize the number of circuit breaker arrangements on a saddle and simultaneously provide the proper safety features desired and/or required.

Accordingly it is desirable to provide a lock-down device and a circuit breaker assembly that overcomes the aforementioned deficiencies. In particular, it is desirable to provide a lock-down device which maximizes the usable slots in a saddle and at the same time provides for maximum safety. The invention disclosed herein achieves the aforementioned and below mentioned objectives.

SUMMARY OF THE INVENTION

Generally speaking, in accordance with the present invention, a lock-down device for use in a circuit breaker assembly is provided. The device is best appreciated when used in combination with an assembly that comprises a saddle, a first circuit breaker mountable on the saddle and a second circuit breaker mountable on the saddle and in facing alignment with the first circuit breaker when both the first and second circuit breakers are mounted on the saddle. In a first embodiment, the device preferably comprises a base for releasably securing the device to the saddle, an arm portion connected to the base, and a hand portion, connected to the arm portion, for engaging the housing of at least the first circuit breaker, wherein when the first and second circuit breakers are mounted on the saddle the hand portion is intermediate a portion of the first and second circuit breaker housings and the first circuit breaker cannot be inadvertently removed from the saddle.

In an alternative embodiment, the hand portion of the device may comprise flanges for engaging and permitting the lock-down of the second circuit breaker as well.

Accordingly, it is an object of the present invention to provide an improved lock-down device for a circuit breaker assembly that provides maximum safety for users.

Another object of the present invention is to provide an improved circuit breaker assembly and lock-down device which permits the utilization of circuit breakers in facing alignment.

Yet another object of the present invention is to provide a lock-down arrangement which requires a minimum number of lock-down devices while achieving maximum safety.

Still another object of the present invention is to provide lock-down construction that is easily installable in a circuit breaker assembly.

Another object of the present invention is to construct a circuit breaker assembly that will prevent the inadvertent removal of circuit breakers mounted thereon.

Yet another object of the present invention is to provide a more economically and efficiently designed circuit breaker assembly.

Still other objects and advantages of the invention will in part be obvious and will in part be apparent from the specification.

The invention accordingly comprises the features of construction, combination of elements and arrangement of parts which will be exemplified in the construction hereinafter set forth, and the scope of the invention will be indicated in the claims.

DETAILED DESCRIPTION OF THE PREFERRED EMBODIMENTS

Figure 1:
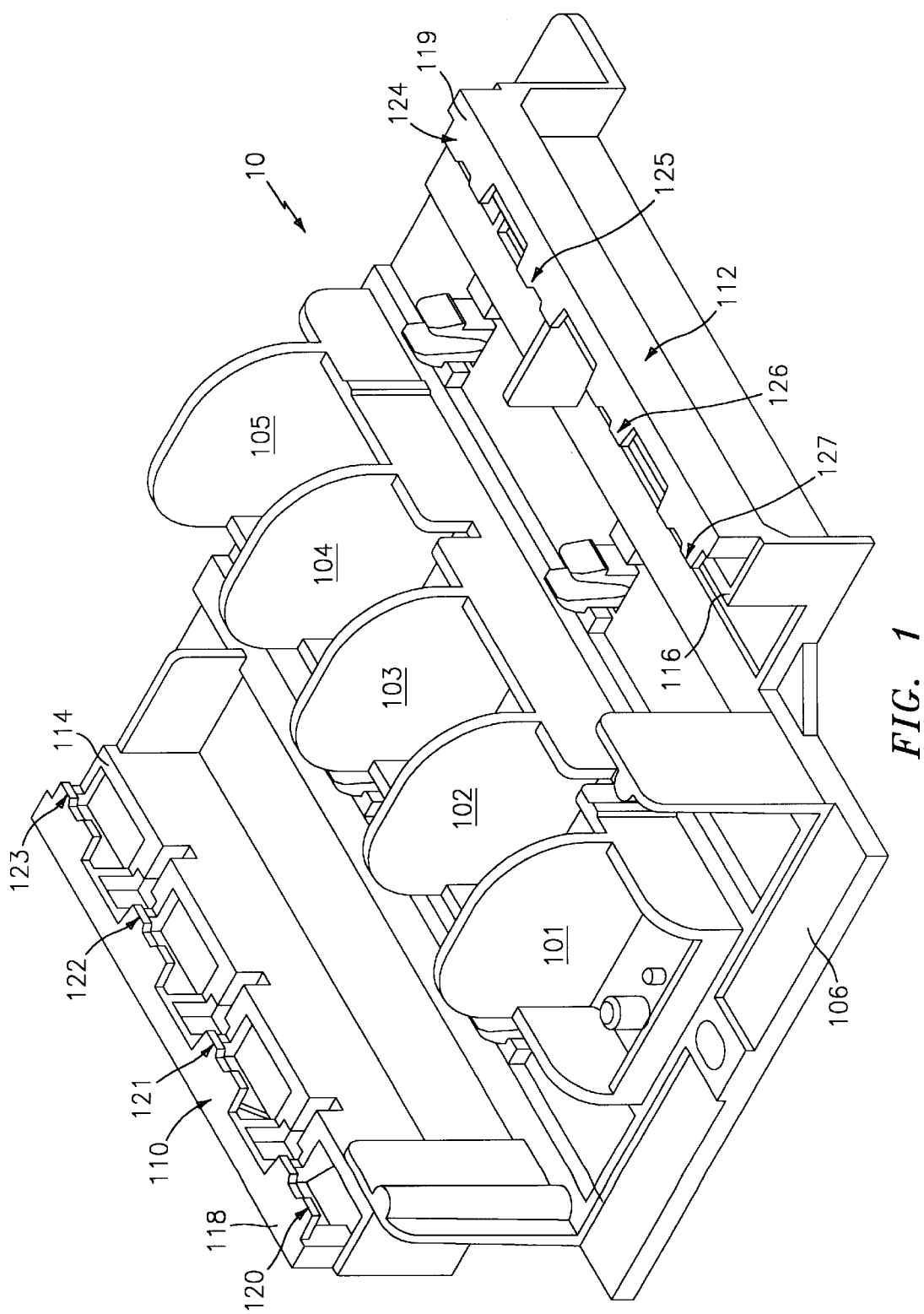
FIG. 1 is a prospective view of a circuit breaker saddle constructed in accordance with the present invention.

Reference is now made to FIG. 1 which depicts an eight circuit breaker (load center) saddle, generally indicated at 10. Saddle 10 preferably includes a unitary plastic constructed base 106 comprising a plurality of integrally formed ribs 101–105. Ribs 101–105 provide electrical clearances for the circuit breakers (not shown) mounted therebetween. Omitted for simplicity (but shown in FIGS. 2 and 5), base 106 may also include a plurality of integrally formed stab terminals disposed between ribs 101–105.

Base 106 also includes an integrally formed first extending subassembly 110 and second extending subassembly 112. Subassembly 110 includes a top surface 114 and subassembly 112 includes a top surface 116. Extendingly integrally from subassemblies 110 and 112 and above top surfaces 114, 116 are respective elongated members 118 and 119. Extending orthoganally from the top edge of elongated member 118 is a plurality of horizontally extending tabs 120–123 and extending orthoganally from the top edge of elongated member 119 is a plurality of horizontally extending tabs 124–127. It can be seen in FIG. 1 that a space is therefore created between the respective top surfaces 114, 116 and the orthoganolly extending tabs.

As would be appreciated, a circuit breaker such as breaker 12 (FIG. 2) or breakers 212 or 214 (FIG. 6) include back hinges 60 (like parts having like reference numerals) which are positioned in the respective spaces provided between the respective tabs and top surfaces. In this way, the circuit breakers are releasable secured at their back ends to base 106 by way of the engagement with the respective tabs. As will be appreciated below, the present invention secures the circuit breakers to the saddle from the front end.

Reference is also made to FIG. 1 to further illustrate that which exists in the prior art although not necessarily utilizing a saddle such as that depicted in FIG. 1. FIG. 1 is only being used for convenience. After briefly discussing the known lock-down arrangements, it will be better appreciated how and why the present invention is advantageous as well as patentable thereover. It will be appreciated by one skilled in the art that saddle 10 can receive, for example, four two-pole circuit breakers or as many as eight single pole circuit breakers. As discussed above, in the first known lock-down arrangement, each lock-down device is located proximate the rear of each circuit breaker, which, relative to FIG. 1, would be generally near each respective tab 120–127. Therefore, if two two-pole circuit breakers were placed in facing alignment such as the arrangement depicted in FIG. 6, at least two lock-down devices would be required. In the second known construction, if only one circuit breaker was mounted on saddle 10, such as the arrangement depicted in FIG. 2, the lock-down device would extend across the saddle (where the second of the two facing alignment circuit breakers would be mounted) thereby effectively eliminating the ability to provide circuit breakers in facing alignment. The present invention significantly improves upon these two known lock-down arrangements.

Figure 2:
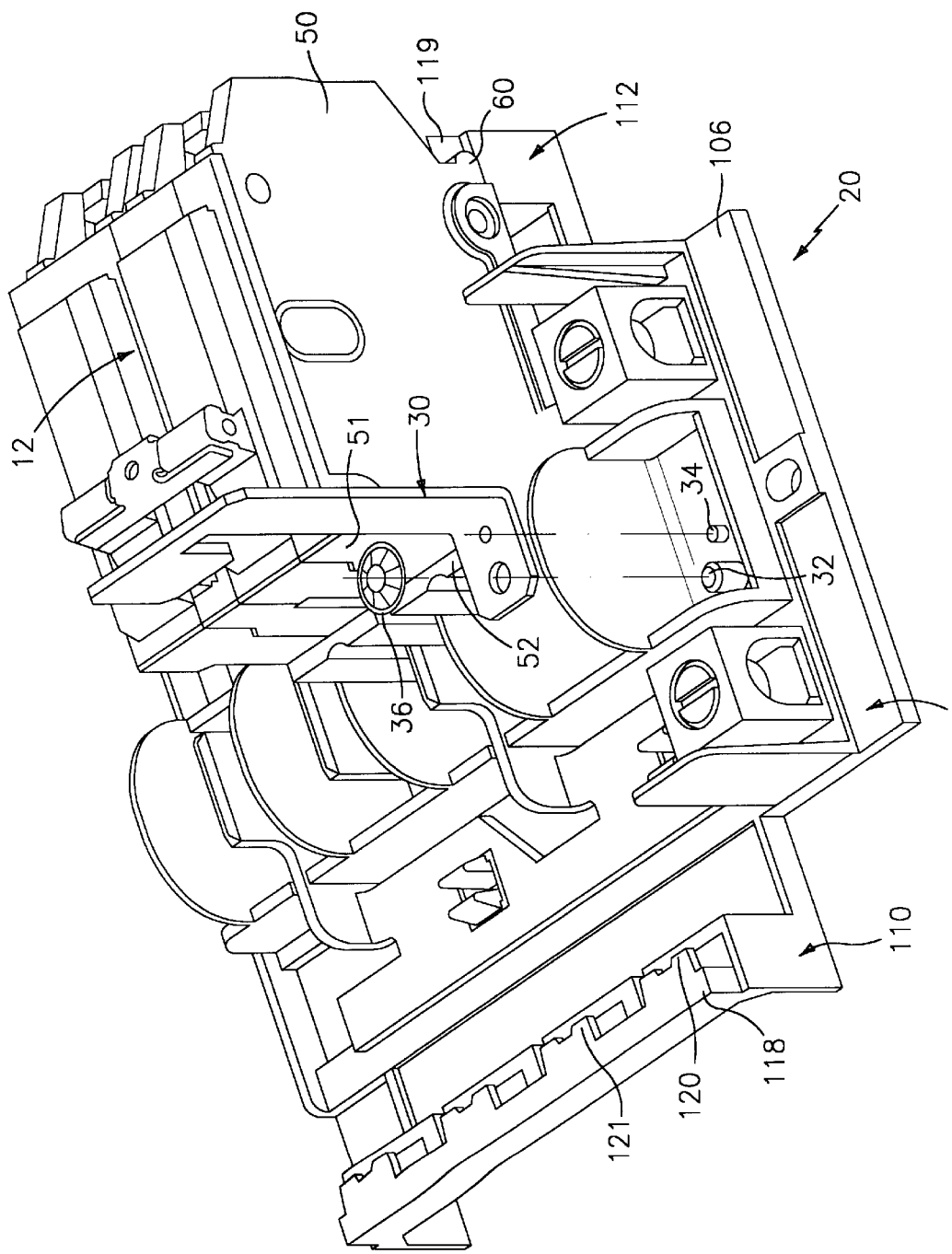
FIG. 2 is a prospective view of a circuit breaker assembly and lock down device constructed in accordance with a first embodiment of the present invention and prior to the circuit breakers' lock down.

Reference is now generally made to FIG. 2 which illustrates a circuit breaker assembly, generally indicated at 20, constructed in accordance with the present invention. Assembly 20 includes saddle 10 with a first two-pole circuit breaker, generally indicated at 12, mounted thereon. It should be noted that the exemplary embodiment depicts a two-pole circuit breaker, but it should be well understood that the present invention is equally applicable to a single-pole circuit breaker arranged thereon, or to a multitude of circuit breakers all aligned along the right side of saddle 10. Details of the construction of saddle 10 and circuit breaker 12 should be well understood by one of skill in the art and will therefore not be repeated herein. Assembly 20 also includes a lock-down device, generally indicated at 30.

Saddle 10 includes integrally formed tabs 32 and 34 for receiving lock-down device 30. A retaining cap 36 is provided over tab 32 and locked in place thereon to secure device 30 to saddle 10. It will be appreciated that many arrangements to secure device 30 to saddle 10 can be employed while remaining within the scope of the invention.

Figure 3:
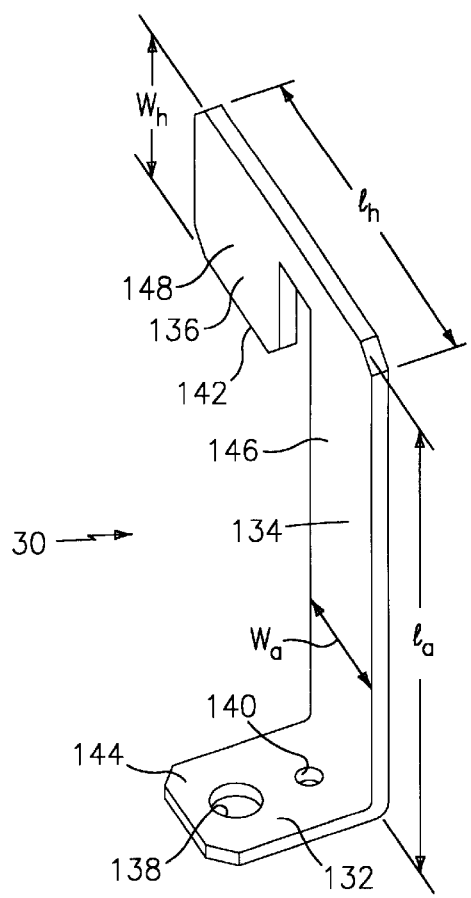
FIG. 3 is prospective view of the lock down device illustrated in FIG. 2.

Reference is now made to FIG. 3, which in connection with the following, more particularly details the preferred construction of lock-down device 30. Lock-down device 30 includes a base 132 having apertures 138 and 140 defined therein. As will now be appreciated, tabs 32 and 34 are respectively inserted within apertures 138 and 140 so that device 30 can be releasably secured to saddle 10. Device 30 also includes an arm portion 134 and a hand portion 136. In the preferred embodiment, base 132, arm portion 134 and hand portion 136 are all integrally formed. As also depicted in FIG. 3, base 132 has a top surface 144 which lies in a first plane while arm portion 134 also has a front surface 146 which lies in a second plane. Similarly, hand portion 136 also has a front surface 148 which lies in the same second plane as the front surface of arm portion 134. The first and second planes are orthogonal to each other. Arm portion 134 has a width $W_a$ and a length $l_a$ and hand portion 136 has a width $W_h$ and a length $l_h$. If the longitudinal axis of arm portion 134 is taken along the length $l_a$ and the longitudinal axis of the hand portion is taken along the length $l_a$, it will be appreciated that the longitudinal axis of the arm portion is orthogonal to the longitudinal axis of the hand portion. Hand portion 136 also includes an edge 142 which as described below, engages a portion of the housing of circuit breaker 12 so as to lock-down circuit breaker 12 on saddle 10.

Figure 4:
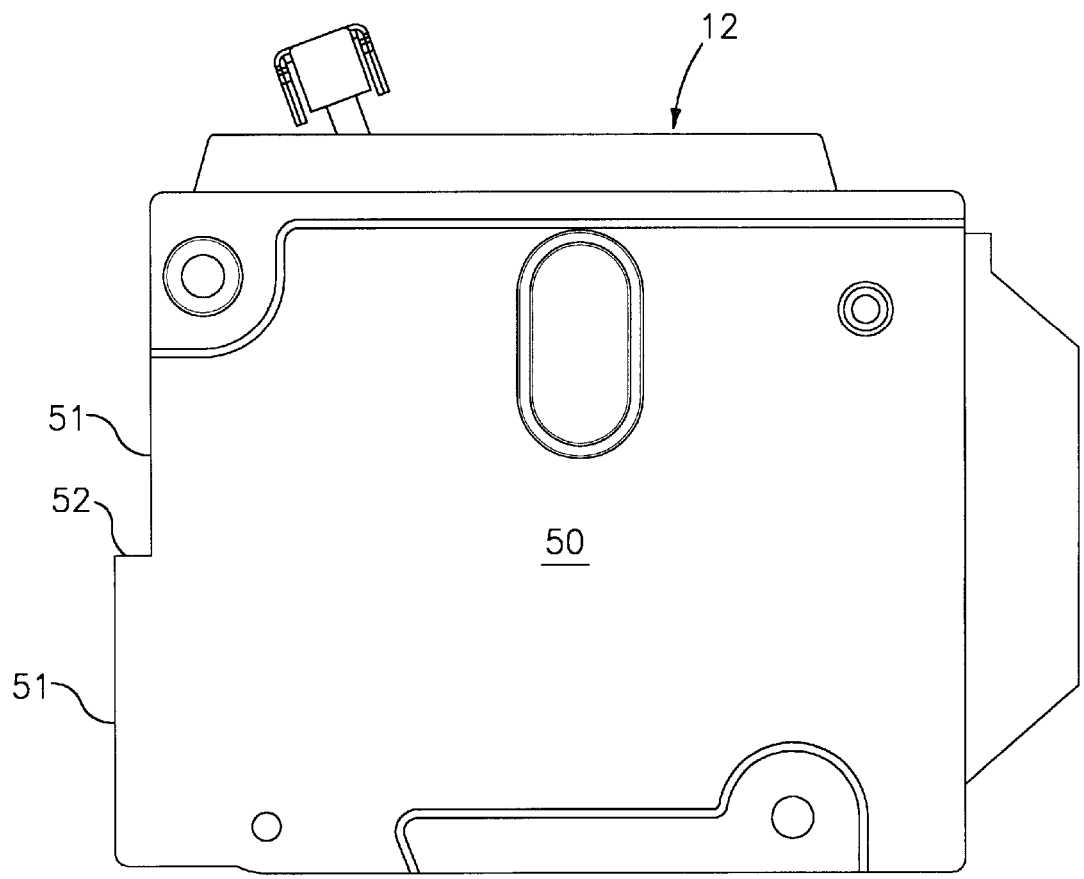
FIG. 4 is an exemplary cross sectional view of a circuit breaker constructed in accordance with the present invention with certain features intentionally left out for purposes of clarity and simplicity.

Turning briefly to FIG. 4 which illustrates in cross section, circuit breaker 12, with certain features intentionally omitted as they do not relate to the present invention and for purposes of clarity. Taking FIG. 4 in combination with FIG. 2, circuit breaker 12 includes a housing 50. Housing 50 includes a front wall 51 which extends outwardly so as to form a lip 52. Lip 52 is wide enough to support the thickness of edge 142 of device 30.

Figure 5:
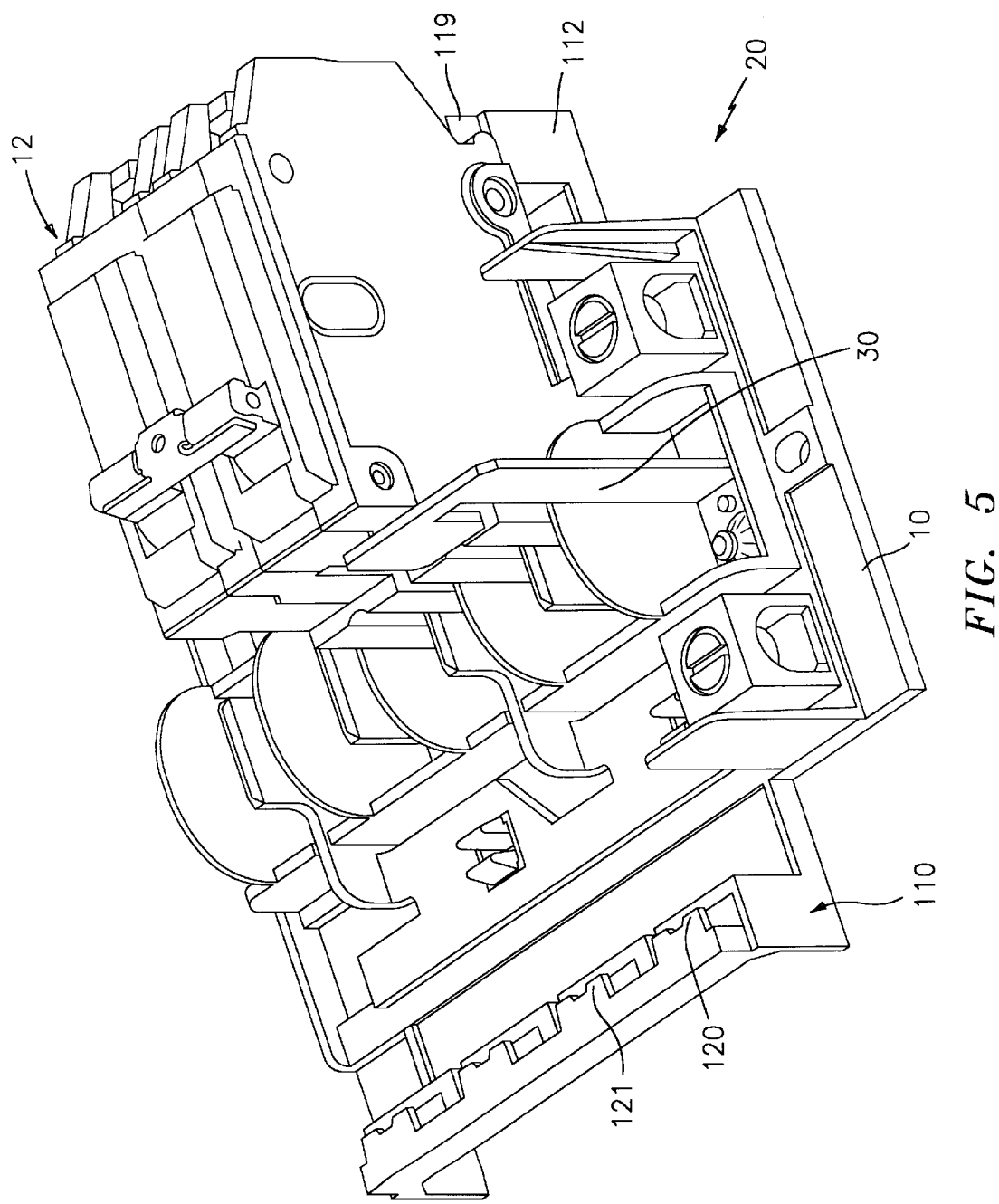
FIG. 5 is a prospective view of the circuit breaker and lock down device of FIG. 2 and illustrating the lock down device in its engaging position.

With reference to FIG. 5, it can now be appreciated that as device 30 is disposed on tabs 32 and 34 of saddle 10, edge 142 of hand portion 136 contacts and engages lip 52 of housing 50. When device 30 is secured to saddle 10, device 30 by way of the engagement of hand portion 136 upon lip 52 prevents circuit breaker 12 from being inadvertently removed from saddle 10. Again, the back of circuit breaker 12 is prevented from removal by way of the appropriate tabs 127, 126. It will now be appreciated that the present invention permits a second circuit breaker, such as a branch breaker, for which removal is permitted, to be mounted on saddle 10 in facing alignment with circuit breaker 12. For example, the back hinge of such a branch breaker would engage tabs 120, 121 of saddle 10. With a branch breaker in place in facing alignment with circuit breaker 12, hand portion 136 is disposed intermediate circuit breaker 12 and the branch breaker.

Figure 6:
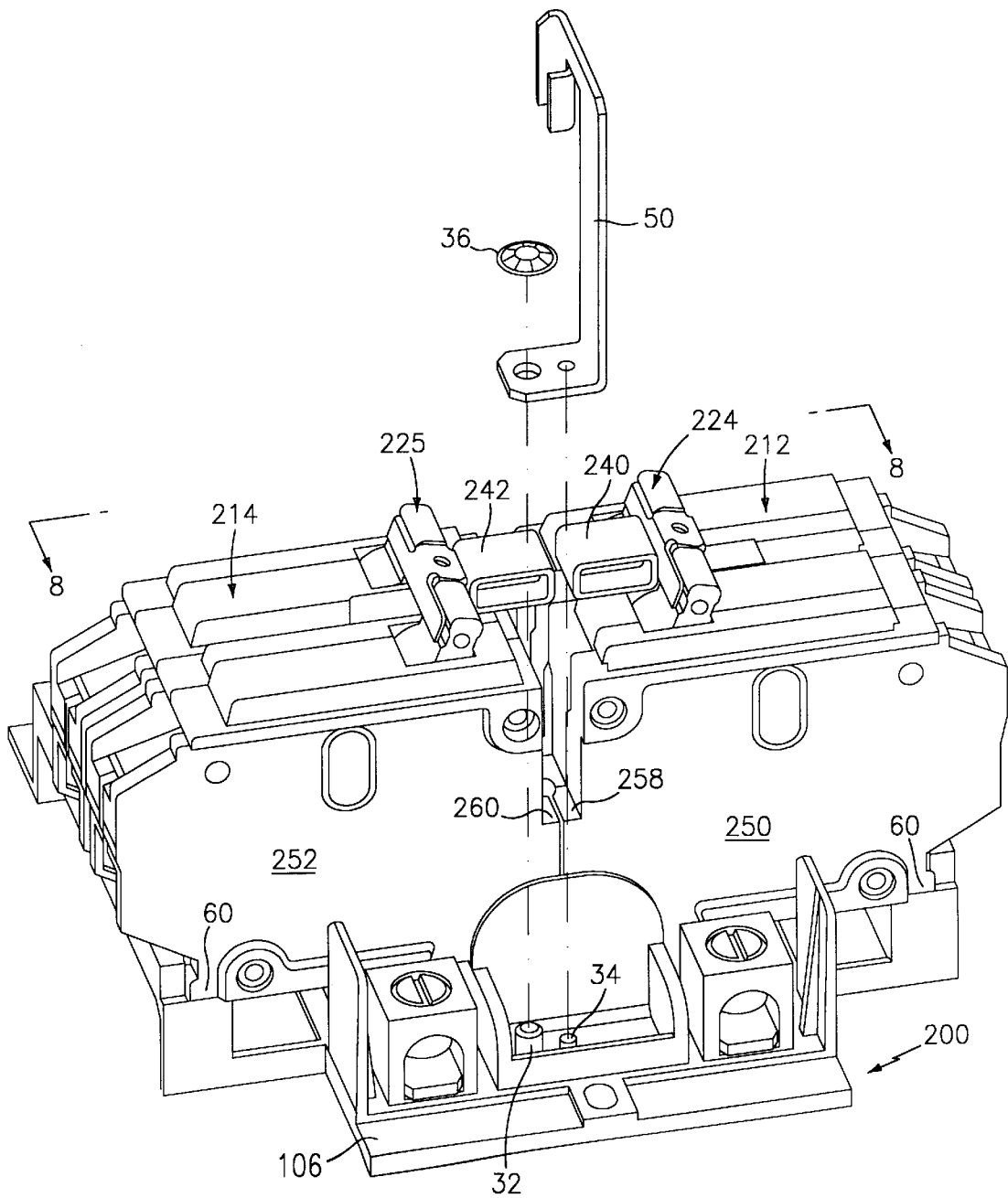
FIG. 6 is a prospective view of a circuit breaker assembly and lock down device constructed in accordance with a second embodiment of the present invention and prior to the circuit breakers' lock down.

Reference is now generally made to FIG. 6 which illustrates a circuit breaker assembly, generally indicated at 200, constructed in accordance with a second embodiment of the present invention. In particular, depicted is a first two-pole circuit breaker, generally indicated at 212, and a second two-pole circuit breaker, generally indicated at 214. Circuit breakers 212 and 214 are in facing alignment with each other. In the present embodiment, it is contemplated that both circuit breakers 212 and 214 are back fed main breakers and therefore, it would be quite undesirable to permit any inadvertent removal of either breaker. Therefore, it is desirable, with one lock-down device, to lock down both circuit breakers 212 and 214. Each circuit breaker 212 and 214 is mounted in a similar fashion to circuit breaker 12 in the first embodiment.

However, prior to discussing the lock-down device of the second embodiment, brief mention is made of the construction of circuit breaker assembly 200, the details of which are described in U.S. application Ser. No. 09/108,584, assigned to the present assignee and incorporated by reference as if fully set forth herein.

Circuit breaker 212, being a two pole breaker, includes a toggle switch assembly 224 for setting circuit breaker 212 in the ON position or the OFF position. Similarly, two-pole circuit breaker 214 includes a toggle switch assembly 225 for setting circuit breaker 214 in the ON or OFF position. Circuit breaker 212 includes an inhibiting connector 240 and circuit breaker 214 includes an inhibiting connector 242, the constructions thereof being identical and described in the aforementioned U.S. application. As will be appreciated, both circuit breakers 212 and 214 are inhibited from being simultaneously placed in the ON position with connectors 240, 242 respectively mounted to their respective toggle switch assemblies.

As it is contemplated that both circuit breakers 212 and 214 are back fed main circuit breakers it is desirable to mount them in facing alignment as depicted in FIG. 6, and further that the present facing alignment arrangement facilitates the use of the aforementioned inhibiting connectors, it is necessary to lock down both circuit breakers 212 and 214 as efficiently as possible. The construction of lock-down device 50 achieves this objective.

Figure 7:
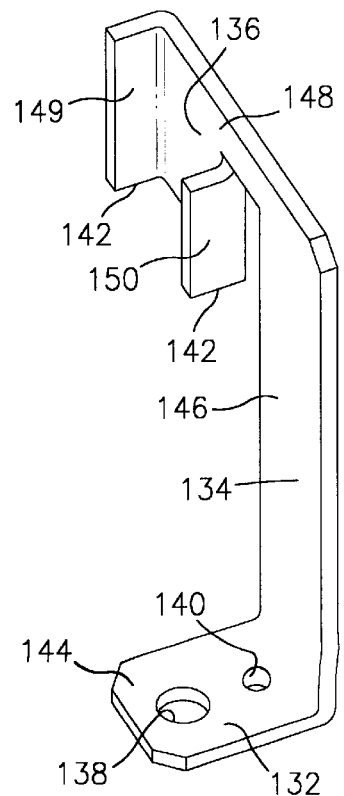
FIG. 7 is a prospective view of the lock down device illustrated in FIG. 6 constructed in accordance with a second embodiment of the present invention.

Reference is therefore made to FIG. 7 for a more detailed description of lock-down device 50, with like reference numerals in device 30 being used for like elements in device 30. In particular, device 50 is a modification of device 30 wherein hand portion 136 is bent at the sides thereof such that two essentially and preferably parallel flanges 149 and 150 are respectively formed. These flanges are orthogonal to front surface 148. In this manner, edge 142 which now includes the bottom edges of flanges 149 and 150 extends outwardly from front surface 148 so as to also engage a lip of the housing of the second breaker 214 as will now be described.

Figure 8:
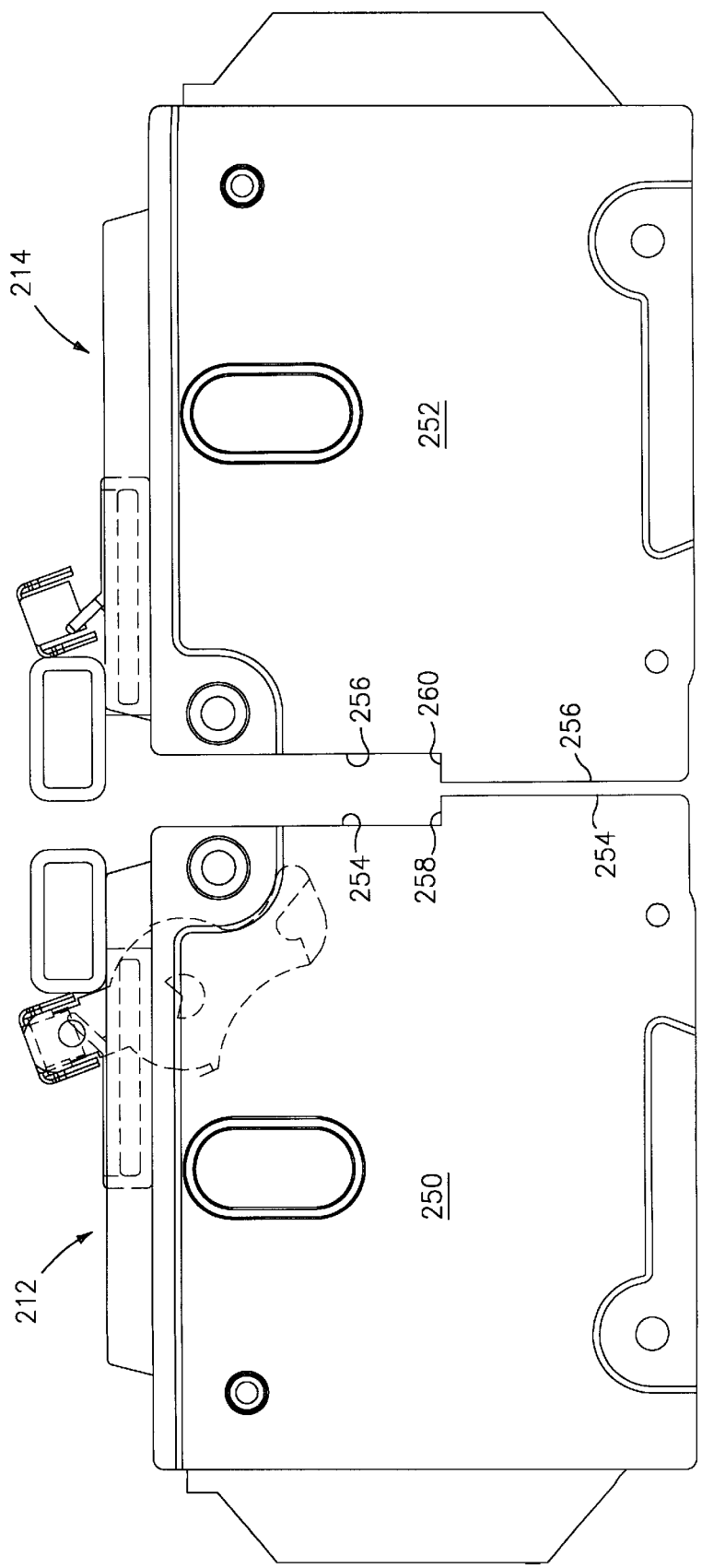
FIG. 8 is an exemplary cross sectional view of FIG. 6 with certain features intentionally left out for purposes of clarity and simplicity.

In particular, as intended as an exemplary construction of two circuit breakers in facing alignment, FIG. 8 is provided with excess detail being omitted for purposes of clarity. In FIG. 8, consistent with FIG. 6, two breakers 212 and 214 are in facing alignment. Each circuit breaker 212, 214 includes a respective housing 250, 252, each housing having respective front walls 254, 256. Similarly to circuit breaker 12, each front wall 254, 256 extends outwardly to form respective lips 258, 260.

Figure 9:
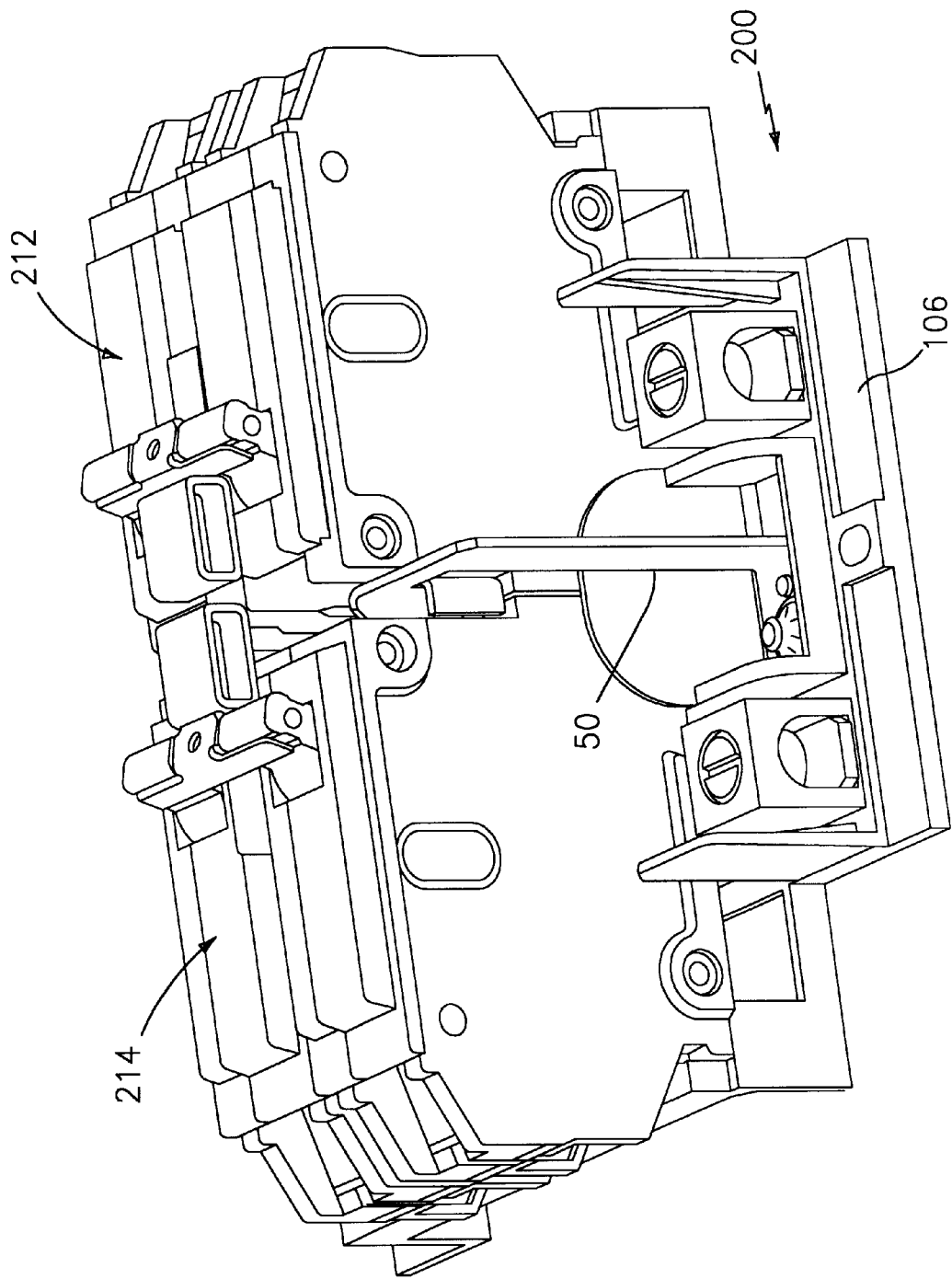
FIG. 9 is a prospective view of the circuit breaker and lock down device of FIG. 6 and illustrating the lock down device in its engaging position.

As can now be appreciated with additional reference being made to FIG. 9, as device 50 is disposed on tabs 32 and 34 of saddle 10, edge 142 of hand portion 136 contacts and engages lips 258 and 260 of respective circuit breaker 212 and 214. When device 50 is secured to saddle 10, device 50 by way of the engagement of hand portion 136 upon lips 258, 260 prevent circuit breakers 212, 214, from being inadvertently removed from saddle 10. Again, the back of circuit breakers 212 and 214 are prevented from removal by way of the appropriate tabs 120, 121, 127, 126. It will now be appreciated that the present invention permits two breakers in facing alignment, such as two back fed main breakers, for which neither removal is permitted, to be mounted on saddle 10 and locked down with only one lock-down device. Similarly, hand portion 136 will be positioned intermediate circuit breakers 212, 214.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention described herein and all statements of the scope of the invention which as a matter of language might fall therebetween.

We claim:

1. A lock-down device for use in a circuit breaker assembly, the assembly comprising a saddle, a first circuit breaker mountable on the saddle and a second circuit breaker mountable on the saddle and in facing alignment with the first circuit breaker when both the first and second circuit breakers are mounted on the saddle, and wherein the first circuit breaker and the second circuit breaker include respective housings, the device comprising:

a base for releasably securing the device to the saddle;

an arm portion integrally formed with the base; and a hand portion, integrally formed with the arm portion, for engaging the housing of at least the first circuit breaker, wherein when the first and second circuit breakers are mounted on the saddle the hand portion is intermediate a portion of the first and second circuit breaker housings;

whereby at least the first circuit breaker is prevented from being inadvertently removed from the saddle.

2. The device as claimed in claim 1, wherein the base includes receiving means for being received by the saddle.

3. The device as claimed in claim 1, wherein the base has a top surface in a first plane and the arm portion and the hand portion each have respective front surfaces in a second plane, said first and second planes being orthogonal to each other.

4. The device as claimed in claim 3, wherein the arm portion has a width and a length and the hand portion has a width and a length, the arm portion having a longitudinal axis taken about the length of the arm portion and lying in the second plane, and the hand portion having a longitudinal axis taken about the length of the hand portion and lying in the second plane;

wherein the longitudinal axis of the arm portion is orthoganol to the longitudinal axis of the hand portion.

5. The device as claimed in claim 1, wherein the hand portion includes a front surface lying in a plane and further includes a first flange orthogonal to the plane and a second flange orthogonal to the plane, the first and second flanges being at least essentially parallel to each other;

wherein the first and second flanges are engageable with the housing of at least the second circuit breaker.

6. A circuit breaker assembly comprising:

a saddle;

a first circuit breaker mountable on the saddle;

a second circuit breaker mountable on the saddle and in facing alignment with the first circuit breaker when both the first and second circuit breakers are mounted on the saddle, and wherein the first circuit breaker and the second circuit breaker include respective housings;

a lock-down device comprising a base securable to the saddle, an arm portion integrally formed with the base, and a hand portion, integrally formed with the arm portion, for engaging the housing of at least the first circuit breaker, wherein when the first and second circuit breakers are mounted on the saddle the hand portion is intermediate a portion of the first and second circuit breaker housings.

7. The assembly as claimed in claim 6, wherein the saddle includes means for receiving the base and the base includes apertures formed therein for being received by the means.

8. The assembly as claimed in claim 6, wherein a front portion of the housing of the first circuit breaker extends outwardly to form a lip and the hand portion of the device is engagable with the lip, wherein the engagement of the hand portion of the device upon the lip when the base is secured to the saddle prevents the first circuit breaker from being inadvertently removed from the saddle.

9. The assembly as claimed in claim 8, wherein a front portion of the housing of the second circuit breaker extends outwardly to form a lip and the hand portion of the device is simultaneously engagable with the lip of the first circuit breaker and the lip of the second circuit breaker;

wherein the engagement of the hand portion of the device upon the second lip when the base is secured to the saddle prevents both the first and second circuit breakers from being inadvertently removed from the saddle.

10. The assembly as claimed in claim 9, wherein the hand portion comprises:

a front surface lying in a plane;

a first flange orthoganol to the plane; and a second flange orthogonal to the plane, the first and second flanges being at least essentially parallel to each other;

wherein the first and second flanges engage at least the lip of the second circuit breaker.

11. A lock-down device for releasably locking at least one circuit breaker to a saddle, the circuit breaker having a housing with a lip extending outwardly from a front surface thereof, the device comprising:

a base for releasably securing the device to the saddle;

an arm portion connected to the base; and a hand portion, connected to the arm portion, for engaging the lip of the at least the first circuit breaker;

wherein when a second circuit breaker is mounted on the saddle, the hand portion is intermediate the first and second circuit breakers.

12. The device as claimed in claim 11, wherein the base has a top surface in a first plane and the arm portion and the hand portion each have respective front surfaces in a second plane, said first and second planes being orthogonal to each other.

13. The device as claimed in claim 12, wherein the arm portion has a width and a length and the hand portion has a width and a length, the arm portion having a longitudinal axis taken about the length of the arm portion and lying in the second plane, and the hand portion having a longitudinal axis taken about the length of the hand portion and lying in the second plane;

wherein the longitudinal axis of the arm portion is orthogonal to the longitudinal axis of the hand portion.

* * * * *